(12) United States Patent
Wallace (10) Patent No.: US 12,026,563 B1
(45) Date of Patent: Jul. 2, 2024

(54) AUTOMATED DYNAMIC BARCODE CONTENT UPDATE MODES

(71) Applicant: Edward L. Wallace, South Orange, NJ (US)

(72) Inventor: Edward L. Wallace, South Orange, NJ (US)

( * ) Notice: Subject to any disclaimer, the term of this patent is extended or adjusted under 35 U.S.C. 154(b) by 0 days.

(21) Appl. No.: 18/585,511

(22) Filed: Feb. 23, 2024

(51) Int. Cl.
*G06K 1/14* (2006.01)
*G06K 7/14* (2006.01)

(52) U.S. Cl.
CPC ............. *G06K 1/14* (2013.01); *G06K 7/1417* (2013.01)

(58) Field of Classification Search
CPC .............................. G06K 1/14; G06K 7/1417
See application file for complete search history.

(56) References Cited

U.S. PATENT DOCUMENTS

2020/0311504 A1* 10/2020 Hu ................... G06K 19/06028

* cited by examiner

*Primary Examiner* — Matthew Mikels (57) ABSTRACT

A system includes a memory device and a processing device. The processing device is operatively coupled to the memory device to perform operations including receiving, from a user device, a request for content accessible via a dynamic barcode, identifying, from a database, a mode variable specifying a mode of operation for updating the content, obtaining, from a mode table of the database corresponding to the mode of operation, mode table data, and causing, based on the mode table data, the content to be provided to the user device.

20 Claims, 6 Drawing Sheets

```
<!DOCTYPE html>
<html>
<head>
<style>
.video-container {
    position: relative;
    width: 100%;
    padding-bottom: 56.25  }
.video-container iframe {
    position: absolute;
    top: 0;
    left: 0;
    width: 90%;
    height: 90%;  }
</style>
</head>
<body>
<div class="video-container">
<iframe width="560" height="315" src="https://www.youtube.com/embed/<?php echo $dest ?>?autoplay=1" frameborder="0" allow="autoplay; encrypted-media" allowfullscreen></iframe>
</div></body></html>
```

```
- Get VCF content where $dest is user from User database
- Assign to vcfContent
Variables
header("Content-Type: text/vcf");
header("Content-Disposition: attachment; filename=\"contact.vcf\"");

// Output the VCF content
echo $vcfContent;
```

AUTOMATED DYNAMIC BARCODE CONTENT UPDATE MODES

TECHNICAL FIELD

The present disclosure is generally related to barcode technology, and more particularly, to implementing automated dynamic barcode content update modes.

BACKGROUND

A barcode is a visual representation of data in a machine-readable form. Some barcodes are one-dimensional (1D) barcodes. A 1D barcode can store data in a single direction (e.g., a horizontal direction or a vertical direction). For example, a 1D barcode can be implemented using parallel lines having varying widths, sizes and/or spacings. 1D barcodes generally encode data specific to a particular object (e.g., Universal Product Codes (UPCs)). Generally, a 1D barcode reader is an optical scanner that can scan and decode a 1D barcode to obtain the data represented by the 1D barcode. For example, a 1D barcode scanner can be a laser-based scanner that generates light toward a surface, receives reflected light from the surface, and converts the reflected light into an electrical signal that can be processed to decode the 1D barcode.

Some barcodes are two-dimensional (2D) barcodes, also referred to as matrix codes. In contrast to 1D barcodes that can store data in only a single direction, 2D barcodes can store data in a first direction and a second direction perpendicular to the first direction. For example, without loss of generality, the first direction can be a horizontal direction and the second direction can be a vertical direction. A 2D barcode can be implemented using a pattern of shapes. Examples of shapes include dots, quadrilaterals (e.g., rectangles), pentagons, hexagons, etc.

In some implementations, a 2D barcode is a Quick Response (QR) code. A QR code is a 2D barcode that is implemented by a combination of black squares arranged in a square grid pattern on a white background. More specifically, a QR code can include reference squares and data squares. The reference squares can be used to normalize the QR code for size, orientation, viewing angle, etc. In some implementations, the reference squares include three distinct reference squares (e.g., three large squares) each positioned at a respective one of three corners of the square grid pattern, and one or more reference squares positioned at a fourth corner of the square grid pattern. The data squares, located throughout the remainder of the QR code, can define the data represented by the QR code.

A 2D barcode can be read using a 2D barcode scanner. For example, a QR code can be read using a QR code scanner, which can be implemented by at least one processing device, to obtain an image of the QR code and decode the QR code to obtain the data represented by the QR code. In some implementations, a mobile device (e.g., smartphone) includes an image capturing device (e.g., camera) that can obtain an image of a QR code, and a QR code scanner.

To decode the QR code, the QR scanner can locate the reference squares of a QR code, and can convert the data squares of the QR code into binary numbers defining data represented by the QR code. The use of the reference squares can enable the image of the QR code to be obtained from multiple different angles and/or orientations. This is in contrast to 1D barcodes, which can generally only be scanned in a single direction. The QR scanner can then validate the data represented by the QR code by using an error-correction method. In some implementations, the error-correction method is Reed-Solomon error correction. The use of error correction can allow the creator of a QR code to adorn the QR code with visual embellishments (e.g., colors, shapes, logos, emojis) without impacting the ability of the QR scanner to decode the QR code.

In contrast to 1D barcodes that store data specific to a particular object, a 2D barcode (e.g., QR code) can store data for a locator, an identifier, web-tracking. In some implementations, a 2D barcode stores data representing identifying a location of a resource on a computer network, such as a Universal Resource Locator (URL). Additionally or alternatively, a 2D barcode can store multimedia data, such as image data, video data, audio data and/or audiovisual data. 2D barcodes can generally store more data than 1D barcodes. Moreover, in contrast to 1D barcodes that generally lack security features, 2D barcodes can be designed to enable security features such as encryption.

One example application of 2D barcodes (e.g., QR codes) is web address (e.g., URL) redirection, in which a 2D barcode stores web address data for a web address that, when decoded by a device including a 2D barcode scanner (e.g., QR code scanner), causes the device to navigate to the web address. Illustratively, the web address can link to a webpage displaying a menu of a restaurant. Since a 2D barcode used for web address redirection links to a web address containing an object, and not the object itself, the use of a 2D barcode enables a user (e.g., creator of the 2D barcode) to alter the content of the web address without having to generate a new QR code. Other examples of applications of 2D barcodes include object tracking (e.g., product labeling, inventory management), electronic ticketing, electronic payments (e.g., by storing payment information), loyalty programs, marketing programs, automated wireless network connection, extended reality (XR) systems (e.g., augmented reality (AR) systems can use 2D barcodes to determine the positions of objects in three-dimensional (3D) space)), etc.

A static barcode is a barcode (e.g., 2D barcode) that stores data representing content that can never be changed (e.g., hardcoded or immutable data). For example, a static barcode can store a web address that, when scanned by a barcode scanner, causes content corresponding to data at the web address to be accessed. Accordingly, any changes to content accessible by scanning a static barcode would require the creation of a new barcode.

A dynamic barcode is a barcode (e.g., 2D barcode) that can enable a user to change content that can be accessed by the barcode, without having to create a new barcode. This is done by storing static data in the dynamic barcode that, when scanned by a dynamic barcode scanner, causes the dynamic barcode scanner to be redirected to a content location from which the content can be retrieved. In this way, the content accessible by scanning the dynamic barcode can be changed by updating the content at the content location, while leaving the static data unchanged. For example, a dynamic barcode can store a first web address that is hardcoded (similar to the web address of the static barcode). When a dynamic barcode scanner reads the dynamic barcode, the dynamic barcode scanner can communicate with an intermediary device (e.g., server) specified by the first web address, and the intermediary device can redirect the dynamic barcode scanner to a second web address corresponding to the content location. Accordingly, any changes to the content accessible by scanning a dynamic barcode can be made without creating a new barcode.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

In typical dynamic barcode implementations, a user manually changes the content at the location from which the content can be retrieved by scanning the dynamic barcode (e.g., the content at the second web address). For example, a user may manually update a database maintained at the content location. However, these implementations do not include or support functionality to enable automated changes to the content by automatically updating the database without additional user interaction. Having a user manually interact with the content location to make changes to the content accessible via the dynamic barcode is tedious, ineffective, time consuming, and is an inefficient use of computational resources.

Aspects of the present disclosure address the above noted and other deficiencies of barcode technology by implementing automated dynamic barcode content update modes. Implementations described herein can be used to automatically update content that can be accessed via a dynamic barcode by scanning the dynamic barcode using a suitable barcode scanner. For example, a dynamic barcode can store static data (e.g., a first web address) that is linked to a location of content (e.g., a second web address), such that a barcode scanner can indirectly access the content via redirection to the location of the content. In some implementations, a barcode is a 2D barcode. For example, the 2D barcode can be a QR code.

An automated dynamic barcode content update mode can be implemented using a dynamic barcode update data structure. A dynamic barcode data structure can have an integrated temporal update feature that can cause a type of content accessible via a dynamic barcode (upon being scanned by a barcode scanner) to be changed automatically without additional user interaction. Implementations described herein can support various modes of operation that can be used to automatically change the type of content accessible via a dynamic barcode (e.g., by scanning the dynamic barcode with a dynamic barcode scanner). Each mode of operation can be represented by a respective mode variable. Depending on the mode of operation, a temporal update parameter can be set that controls when the type of content accessible via a barcode is to be changed. Accordingly, a barcode data structure is a data structure that can control when and/or how a type of content accessible via a dynamic barcode can change without additional user interaction. Further details regarding example modes of operation, as well as how to implement the various modes of operation, will be described herein.

Implementations described herein can provide a number of technological benefits. For example, by using a special-purpose database that enables programming of automated updates to types of content accessible via a dynamic barcode without additional user interaction, implementations described herein can eliminate the having to manually update types of content accessible via the dynamic barcode every time that the user wants it to change. This can, e.g., decrease computational resource consumption.

Figure 1:
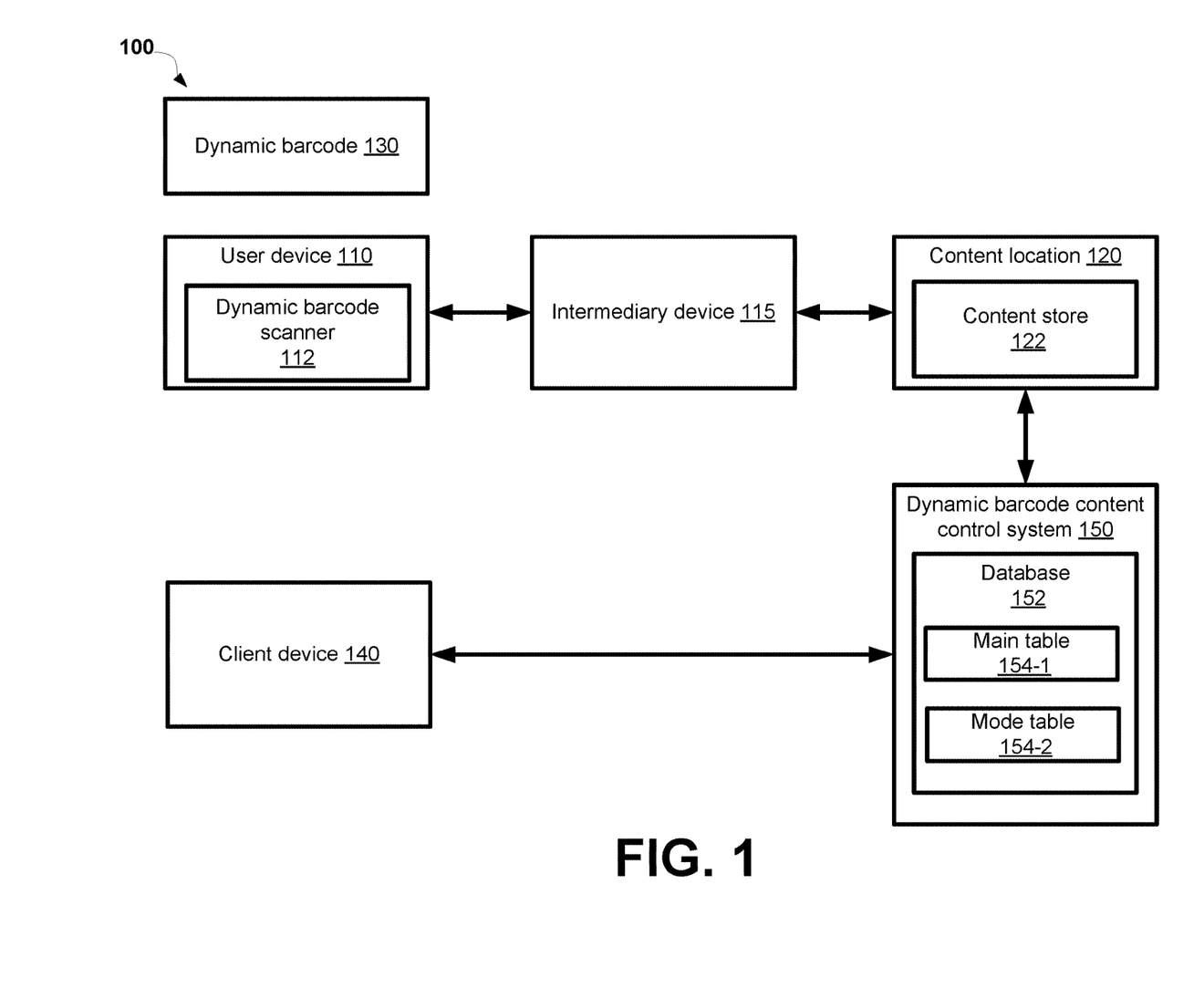
FIG. 1 depicts a block diagram of an example computer system that can implement automated dynamic barcode content update modes, in accordance with some implementations.

FIG. 1 is a block diagram of a system 100 that can implement automated dynamic barcode content update modes, in accordance with some implementations. As shown, system 100 can include a user device 110, an intermediary device 115, at least one content location 120. The user device 110 can be communicably coupled to the intermediary device 115 and the content location 120 via at least one network, which may be a private network (e.g., a local area network (LAN), a wide area network (WAN), intranet, or other similar private networks) or a public network (e.g., the Internet). The user device 110, the intermediary device 115 and the content location 120 may each be implemented as a mobile device, a laptop, a desktop computer, a tablet computing device, a server device, and/or any other computing device.

As further shown, the user device 110 can include a dynamic barcode scanner 112 that can read a dynamic barcode, such as dynamic barcode 130. In some implementations, the dynamic barcode 130 is a 2D barcode. For example, the dynamic barcode 130 can be a QR code. The dynamic barcode 130 can store static data that, when scanned by the dynamic barcode scanner 112, causes the dynamic barcode scanner 112 to be redirected to the content location 120 from which the content can be retrieved from a content store 122 at the content location 120. In this way, the content accessible by scanning the dynamic barcode 130 can be changed by updating the content at the content location 120, while leaving the static data unchanged. For example, the dynamic barcode 130 can store a first web address that is hardcoded. When the dynamic barcode scanner 112 scanner reads the dynamic barcode 130, the dynamic barcode scanner 112 can communicate with the intermediary device 115 specified by the first web address, and the intermediary device 115 can redirect the dynamic barcode scanner 112 to a second web address corresponding to the content location 120 to access the content from the content store 122. Accordingly, any changes to the content accessible by scanning the dynamic barcode 130 can be made without creating a new barcode.

As further shown, the system 100 further includes at least one client device 140 and a dynamic barcode content control system ("system") 150. The client device 140 can be communicably coupled to the system 150, and the system 150 can be communicably coupled to the content location 120 via at least one network, which may be a private network (e.g., a local area network (LAN), a wide area network (WAN), intranet, or other similar private networks) or a public network (e.g., the Internet). The client device 140 and the system 150 may each be implemented as a mobile device, a laptop, a desktop computer, a tablet computing device, a server device, and/or any other computing device. In some implementations, the user device 110 is the client device 140. In some implementations, the user device 110 is different from the client device 140. In some implementations, the system 150 is the content location 120 or is a component of the content location 120. In some implementations, the system 150 is the client device or is a component of the client device 140. In some implementations, the system 150 is separate from the content location 120 and/or the client device 140.

The client device 140 can be operated by a manager of the dynamic barcode 130 (e.g., the creator of the dynamic barcode 130). The manager of the dynamic barcode 130 can use the client device 140 to cause the system 150 to update the content accessible via the dynamic barcode 130 at the content location 120.

The system 150 can include a database 152 maintaining data that is used to control access of content via the dynamic barcode 130. More specifically, the database 152 can implement at least one mode of operation to cause a type of content accessible via the dynamic barcode 130 (upon being scanned by the dynamic barcode scanner 112) to be changed (e.g., at the content location 120). The database 152 can support various modes of operation that can be used to control the type of content that is accessible via the dynamic barcode 130 (e.g., by scanning the dynamic barcode 130 with the dynamic barcode scanner 112). Each mode of operation can be represented by a respective mode variable within the database 152.

One mode of operation is referred to herein as a "manual content update mode" that can enable a manager of the dynamic barcode 130 to manually update the type of content accessible via the dynamic barcode 130. In other words, system 150 can support manual changes to the content accessible via the dynamic barcode 130.

Another mode of operation can be a non-manual content update mode. One example of a non-manual content update mode is referred to herein as an "automatic mode." To implement the automatic mode, a manager of the dynamic barcode 130, via the client device 140, can initialize the automatic mode in the database 152 by setting a type of content accessible via the dynamic barcode 130, and setting a datetime parameter reflecting a date and time that the manager of the dynamic barcode 130 wants the type of content accessible via the dynamic barcode 130 to be updated. In other words, the type of content that can be accessed by scanning the dynamic barcode 130 with the dynamic barcode scanner 112 can change at the date and time specified by a datetime parameter. Accordingly, the automatic mode can be used to enable a type of content accessible via the dynamic barcode 130 to automatically change at a date and time defined by a datetime parameter without additional user interaction.

Another example of a non-manual content update mode is referred to herein as a "repeat mode." To implement the repeat mode, a manager of the dynamic barcode 130, via the client device 140, can initialize the database 152 by setting a type of content accessible via the dynamic barcode 130, and setting a repeat parameter defining a repeat time interval for the type of content accessible via the dynamic barcode 130. The type of content accessible via the dynamic barcode 130 can be updated in response to expiration of the repeat time interval. In other words, the content that is accessed by scanning the dynamic barcode 130 with the dynamic barcode scanner 112 can change after the expiration of the repeat time interval. Accordingly, the repeat mode can be used to enable a type of content accessible via the dynamic barcode 130 to automatically change at the expiration of a repeat time interval defined by a repeat parameter without additional user interaction.

Yet another example of a non-manual content update mode is referred to herein as an "automated repeat" mode. To implement the automated repeat mode, a manager of the dynamic barcode 130, via the client device 140, can initialize the automated repeat mode in the database 152 by setting a type of content accessible via the dynamic barcode 130, and setting a time parameter specifying a time, each day, that the manager of the dynamic barcode 130 wants the type of content accessible via the dynamic barcode 130 to change. In other words, the type of content that can be accessed by scanning the dynamic barcode 130 with the dynamic barcode scanner 112 can automatically change every day at the time specified by the time parameter. Accordingly, the automated repeat mode can be used to enable a type of content accessible via the dynamic barcode 130 to automatically change at a time defined by a time parameter without additional user interaction.

In some implementations, a manager of the dynamic barcode 130 initializes the dynamic barcode 130. Initializing the dynamic barcode 130 can include initializing the database 152 to implement at least one mode of operation. To initialize the database 152, a manager of the dynamic barcode 130 can, via the client device 140, cause a main table 154-1 of the database 152 to be initialized (e.g., updated). In some implementations, the main table 154-1 is a default table. Causing the main table 154-1 to be initialized can include storing a set of base initialization data within the main table 154-1.

For example, the set of base initialization data can include a content variable identifying the type of content accessible via the dynamic barcode 130. Causing the main table 154-1 to be initialized can include setting the content variable. Any suitable type of content accessible via the dynamic barcode 130 can be specified by the content variable in accordance with implementations described herein. Examples of types of content accessible via the dynamic barcode 130 that can be specified by the content variable include a banner/ad, an image, a PDF (Portable Document Format) file, Virtual Contact File (VCF or vCard), multimedia content (e.g., online multimedia content), a web address (e.g., URL), etc.

As another example, the set of base initialization data can include an initial set of mode of operation data. Causing the main table 154-1 to be initialized can include setting the initial set of mode of operation data. The initial set of mode of operation data can include a mode variable specifying the mode of operation. For example, the mode variable can specify a non-manual content update mode (e.g., an automatic mode, a repeat mode, or an automated repeat mode), or a manual content update mode. In some implementations, the initial set of mode of operation data further includes auxiliary data. The auxiliary data can be used to refine the mode of operation. One example of auxiliary data is time zone data. In some implementations, setting the initial set of mode of operation data includes setting the dynamic barcode 130.

After storing the set of base initialization data in the main table 154-1, a destination variable specifying a destination for the content can be generated based on the content variable specifying the type of content. Generating a destination variable can include assigning the destination variable to an identifier of the content.

For example, if the type of content specified by the content variable is a banner/ad, then generating a destination variable for the banner/ad can include uploading the banner/ad and copying the banner/ad to an image directory, and assigning the destination variable for the banner/ad to an identifier of the banner/ad (e.g., banner/ad name).

As another example, if the type of content specified by the content variable is an image, then generating a destination variable for the image can include uploading the image and copying the image to an image directory, and assigning the destination variable for the image to an identifier of the image (e.g., image name).

As yet another example, if the type of content specified by the content variable is a PDF file, then generating a destination variable for the PDF file can include uploading a PDF and copying the PDF to an image directory, and assigning the destination variable for the PDF content to an identifier of the PDF (e.g., PDF name).

As yet another example, if the type of content specified by the content variable is online multimedia content, then generating a destination variable for the online multimedia content can include setting an identifier of the online multimedia content, and assigning the destination variable for the online multimedia content to the identifier of the online multimedia content.

As yet another example, if the type of content specified by the content variable is a VCF, then generating a destination variable for the VCF can include obtaining contact information for a given user, and assigning the destination variable for the VCF to the given user.

As yet another example, if the type of content specified by the content variable is a web address (e.g., URL), then generating a destination variable for the web address can include setting the web address (e.g., URL), and assigning the destination variable for the web address to the web address. Illustratively, if the web address is a social media web address, then generating a destination variable for the social media web address (e.g., social media URL) can include setting a social media web address (e.g., social media URL), and assigning the destination variable for the social media web address to the social media web address.

In some implementations, initializing the dynamic barcode 130 further includes generating an image of the dynamic barcode 130. In some implementations, initializing the dynamic barcode 130 further includes generating a file that can be used to identify the mode variable from the database 152 (e.g., the main table 154-1). For example, the file can be an index.php file that can cause the mode variable to be read from the database 152.

Initializing the database 152 can further include initializing (e.g., updating) at least one mode table 154-2 of the database 152. The mode table 154-2 corresponds to (e.g., is initialized for) the mode of operation specified by the mode variable. For example, if the mode variable specifies that the mode of operation is the manual content update mode, then the mode table 154-2 can be a manual content update mode table, and updating the mode table 154-2 can include storing the destination variable and dynamic barcode (e.g., QR code) in the mode table 154-2.

If the mode variable specifies that the mode of operation is a non-manual content update mode (e.g., the automatic mode, the repeat mode, or the automated repeat mode), then updating the mode table 154-2 can include setting a parameter defining the non-manual mode, and storing the destination variable, the file, the parameter, and any auxiliary data (e.g., time zone data). For example, if the mode of operation specified by the mode variable is the automatic mode, then the mode table 154-2 is an automatic mode table, and the parameter is a datetime parameter specifying the date and time defining the automatic mode. As another example, if the mode of operation specified by the mode variable is the repeat mode, then the mode table 154-2 is a repeat mode table, and the parameter is a repeat parameter specifying the repeat time interval defining the repeat mode. As yet another example, if the mode of operation specified by the mode variable is the automated repeat mode, then the mode table 154-2 is an automatic mode table, and the parameter is a time parameter specifying the time defining the automated repeat mode.

After the database 152 is initialized (e.g., the main table 154-1 and the at least one mode table 154-2 is initialized), the system 150 can then be used to control access to the type of content accessible via the dynamic barcode 130. For example, a user can scan, using the dynamic barcode scanner 112, the dynamic barcode 130 to access content at a particular time. Upon scanning the dynamic barcode 130, the system 150 receives a request for content at the content location 120. In response to receiving the request, the system 150 can execute the file (e.g., index.php file) to retrieve data from the main table 154-1, and identify the mode variable from the data retrieved from the main table 154-1

After identifying the mode variable, the system 150 can cause content to be provided to the user device 110 based on the mode variable. More specifically, causing the content to be provided to the user can include retrieving mode table data from the mode table 154-2 corresponding to the mode of operation specified by the mode variable, and outputting the content based on the mode table data. For example, outputting the content based on the mode table data can include processing the mode table data to identify the destination from the destination variable and the type of content from the content variable.

For example, if the mode variable specifies the mode of operation as the manual content update mode, then the mode table 154-2 is the manual content update table, and the mode table data is manual content update table data. Processing the manual content update table data can include selecting a row from the mode table 154-2 that references the particular dynamic barcode (e.g., QRCode=Code), and identifying (e.g., retrieving) the destination variable and the content variable from the selected row.

As another example, if the mode variable specifies the mode of operation as the automatic mode, then the mode table 154-2 is the automatic mode table, and the mode table data is automatic mode table data. Processing the automatic mode table data can include selecting a row from the mode table 154-2 in which the date/time specified by the datetime parameter is less than the current timestamp (date/time) that the content is being accessed. Processing the automatic mode table data can then include identifying (e.g., retrieving), from the selected row, the destination variable and the content variable. In some implementations, processing the automatic mode table data further includes include deleting data from the mode table 154-2 in which the date/time is less than a date/time identified from the selected row.

As yet another example, if the mode variable identifies the mode of operation as the repeat mode, then the mode table 154-2 is the repeat mode table, and the mode table data is repeat mode table data. Processing the repeat model table data can include selecting a row from the mode table 154-2 based on the repeat time interval and the current timestamp (time) that the content being accessed. For example, a row identifier value (ID) for the mode table 154-2 can be calculated using the following equation:

$$ID = \frac{Y(\text{round}(X) - \lfloor X \rfloor)}{I} + 1 \qquad (1)$$

where round(•) is a round function that rounds the argument of the round function to the nearest integer, $\lfloor \cdot \rfloor$ is the floor function (or greatest integer function) that outputs the greatest integer less than or equal to the argument of the floor function, and I is the repeat time interval in minutes. X and Y can be given by the following equations:

$$X = \frac{t_c - t_s}{60 r I} \qquad (2)$$

$$Y = Ir \qquad (3)$$

where $t_c$ is the current timestamp, $t_s$ is the start timestamp, and r is the number of rows in the mode table 154-2. The start timestamp indicates a start time, which is the time at which user initializes or updates the repeat mode. Processing the repeat mode table data can then include selecting a row from the mode table 154-2 based on the ID, and identifying (e.g., retrieving), from the selected row, the destination variable and the content variable. For example, the selected row can be a row in which an incremental ordering value (SID) is less than or equal to ID. More specifically, the SID can be an integer that defines the incremental ordering of the rows within the mode table 154-2.

As yet another example, if the mode variable specifies the mode of operation as the automated repeat mode, then the mode table 154-2 is the automated repeat mode table, and the mode table data is automated repeat mode table data. Processing the automated repeat mode table data can include determining whether the mode table 154-2 includes a row in which the time specified by the time parameter is less than the current timestamp (time) that the content is being accessed. If so, then processing the automated repeat mode table data can include selecting the row in which the time specified by the time parameter is less than the current timestamp that the content is being accessed. If the mode table 154-2 does not include a row in which the time specified by the time parameter is less than the current timestamp that the content is being accessed, then processing the automated repeat mode table data can include selecting, from the mode table 154-2, a row having the greatest time specified by the time parameter. This specifies the row of the mode table 154-2 that is set to the greatest time value. This is done to account for scenarios in which the current time is less than the smallest time value in the mode table 154-2. In such scenarios, the row selection criteria may not be met, and the system 150 will proceed to select the row with the greatest time value. For example, if the mode table 154-2 has three rows with 11:00 AM, 1:00 PM and 3:00 PM, and the current time is 10:00 AM, then none of these values would meet the selection criteria. In this case, the system 150 will display the content of the row with the 3:00 PM timestamp.

After selecting a row, processing the automated repeat mode table data can further include and identifying (e.g., retrieving), from the selected row, the destination variable and the content variable. The content can be output based on the destination and type of content. For example, code for providing the content to the user device 110 can be obtained (e.g., generated) based on the destination and the type of content. For example, the code can include one or more of a HyperText Markup Language (HTML) document, a script, a function, etc.

Further details regarding initializing the database 152 to enable automated dynamic barcode content update modes will be described herein below with reference to FIG. 2. Further details regarding implementing the database 152 to enable automated dynamic barcode content update modes will be described herein below with reference to FIG. 3. Examples of code that can be used to obtain example types of content will be described in further detail below with reference to FIGS. 4A-4E.

Implementations described herein can be used within a wide variety of practical applications. For example, a type of content accessible via the dynamic barcode 130 can be a type of restaurant menu. A restaurant owner, using client device 140, can program the dynamic barcode 130 to implement at least one automated dynamic barcode content update mode to automatically change the type of restaurant menu that is accessible via the dynamic barcode 130 without additional interaction by the restaurant owner. Illustratively, a restaurant owner can configure the database 152 to cause a breakfast menu to be displayable by scanning the dynamic barcode 130 every day starting at 6:00 AM, a lunch menu to be displayable by scanning the dynamic barcode 130 every day starting at 11:00 AM, and a dinner menu to be displayable every day by scanning the dynamic barcode 130 every day starting at 4:00 PM.

Figure 2:
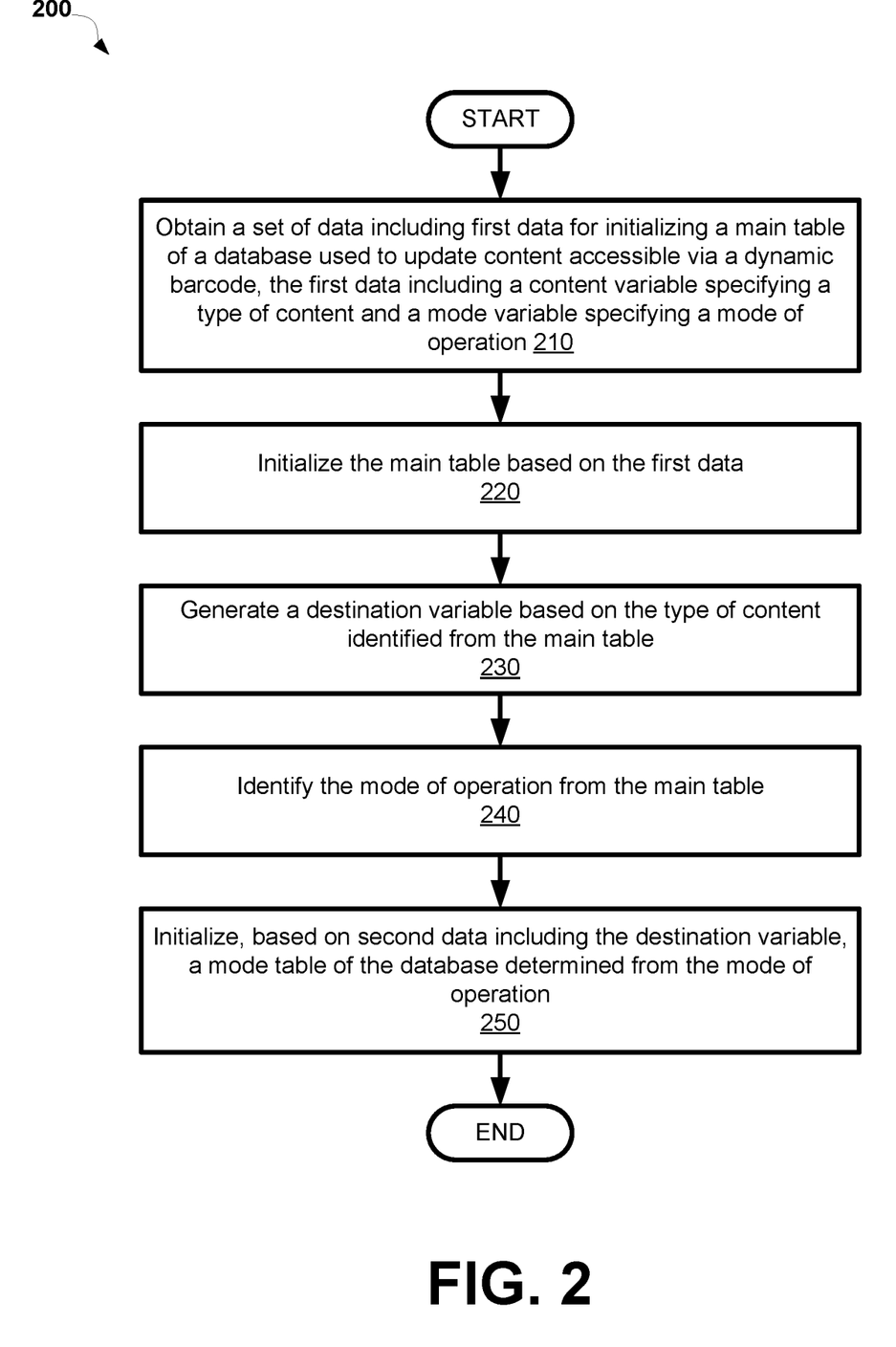
FIG. 2 is a flow diagram of an example method for initializing a database that can be used to implement automated dynamic barcode content update modes, in accordance with some embodiments.

FIG. 2 is a flow diagram of an example method 200 for initializing a database that can be used to implement automated dynamic barcode content update modes, in accordance with some implementations. The method 200 may be performed by processing logic that may comprise hardware (circuitry, dedicated logic, etc.), computer-readable instructions (run on a general-purpose computer system or a dedicated machine), or a combination of both. In an illustrative example, the method 200 may be performed by a dynamic barcode content update system, such as the system 150 of FIG. 1. Alternatively, some or all of the method 200 might be performed by another module or machine. It should be noted that blocks depicted in FIG. 2 could be performed simultaneously or in a different order than that depicted.

At operation 210, processing logic obtains a set of data including first data for initializing a main table of a database used to update content accessible via a dynamic barcode, the first data including a content variable specifying a type of content and a mode variable specifying a mode of operation. In some implementations, the mode variable specifies a non-manual content update mode to update the content automatically without additional user interaction. For example, the mode variable can specify an automatic mode that automatically updates the content at a date and time in accordance with a datetime parameter. As another example, the mode variable can specify a repeat mode that automatically updates the content after expiration of a repeat time interval. As yet another example, the mode variable can specify an automated repeat mode that automatically updates the content daily at a particular time in accordance with a time parameter. In some implementations, the mode variable specifies a manual content update mode. In some implementations, obtaining the set of data further includes generating at least one of: an image of the dynamic barcode or a file that can be used to identify the mode variable from the main table. For example, the file can be an index.php file.

At operation 220, processing logic initializes the main table based on the first data. For example, initializing the main table can include updating the main table to include at least the content variable and the mode variable. In some implementations, the first data further includes auxiliary data that can be used to refine the mode of operation. For example, the auxiliary data can include time zone data.

At operation 230, processing logic generates a destination variable based on the type of content identified from the main table. In some implementations, generating the destination variable includes assigning the destination variable to an identifier of the type of content.

At operation 240, processing logic identifies the mode of operation from the main table and, at operation 250, processing logic initializes, based on second data including the destination variable, a mode table of the database determined from the mode of operation. The second data can further include code. In some implementations, the mode of operation is a non-manual content update mode, and the second data further includes a temporal parameter. For example, if the mode of operation is the automatic mode, then the temporal parameter can be a datetime parameter. As another example, if the mode of operation is the repeat mode, then the temporal parameter can be a repeat interval. As yet another example, if the mode of operation is the automated repeat mode, then the temporal parameter can be a time parameter. In some implementations, the second data further includes auxiliary data (e.g., time zone data). Further details regarding operations 210-250 are described above with reference to FIG. 1.

Figure 3:
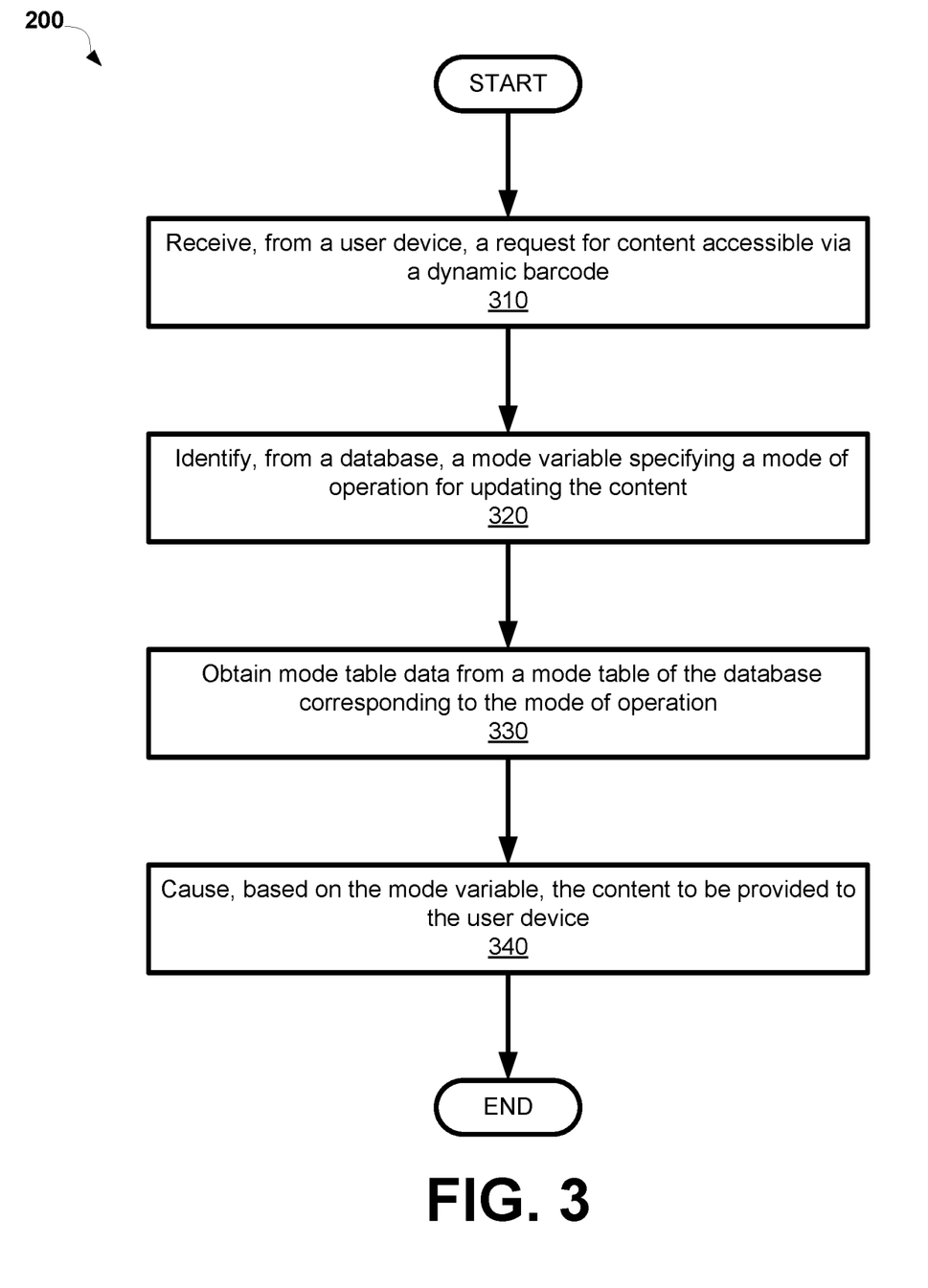
FIG. 3 is a flow diagram of an example method for implementing automated dynamic barcode content update modes, in accordance with some implementations.

FIG. 3 is a flow diagram of an example method 300 for implementing automated dynamic barcode content update modes, in accordance with some implementations. The method 300 may be performed by processing logic that may comprise hardware (circuitry, dedicated logic, etc.), computer-readable instructions (run on a general-purpose computer system or a dedicated machine), or a combination of both. In an illustrative example, method 300 may be performed by a dynamic barcode content update system, such as the system 150 of FIG. 1. Alternatively, some or all of method 300 might be performed by another module or machine. It should be noted that blocks depicted in FIG. 4 could be performed simultaneously or in a different order than that depicted.

At operation 310, processing logic receives, from a user device, a request for content accessible via a dynamic barcode. For example, the request can be received from a dynamic barcode scanner of the user device that scanned the dynamic barcode. In some implementations, the dynamic barcode is a 2D barcode. For example, the dynamic barcode can be implemented as a QR code. In some implementations, the request is forwarded from an intermediary device (e.g., intermediary device 115 of FIG. 1).

At operation 320, processing logic identifies, from a database, a mode variable specifying a mode of operation for updating the content. In some implementations, identifying the mode variable further comprises causing main table data to be retrieved from a main table of the database, and identifying the mode variable from the main table data. In some implementations, the mode variable specifies a non-manual content update mode to update the content automatically without additional user interaction. For example, the mode variable can specify an automatic mode that automatically updates the content at a date and time in accordance with a datetime parameter. As another example, the mode variable can specify a repeat mode that automatically updates the content after expiration of a repeat time interval. As yet another example, the mode variable can specify an automated repeat mode that automatically updates the content daily at a particular time in accordance with a time parameter. In some implementations, the mode variable specifies a manual content update mode.

At operation 330, processing logic obtains mode table data from a mode table of the database corresponding to the mode of operation and, at operation 340, processing logic causes, based on the mode variable, the content to be provided to the user device. In some implementations, causing the content to be provided to the user device includes selecting a row from the mode table data in accordance with the mode of operation, identifying, from the row, a type of content from a content variable and a destination from a destination variable, and outputting the content based on the type of content and the destination. In some implementations, the type of content is at least one of: a banner/ad, an image, a PDF file, a VCF, multimedia content (e.g., online multimedia content), or a web address (e.g., URL). Further details regarding operations 310-340 are described above with reference to FIGS. 1-2.

Figure 4A:
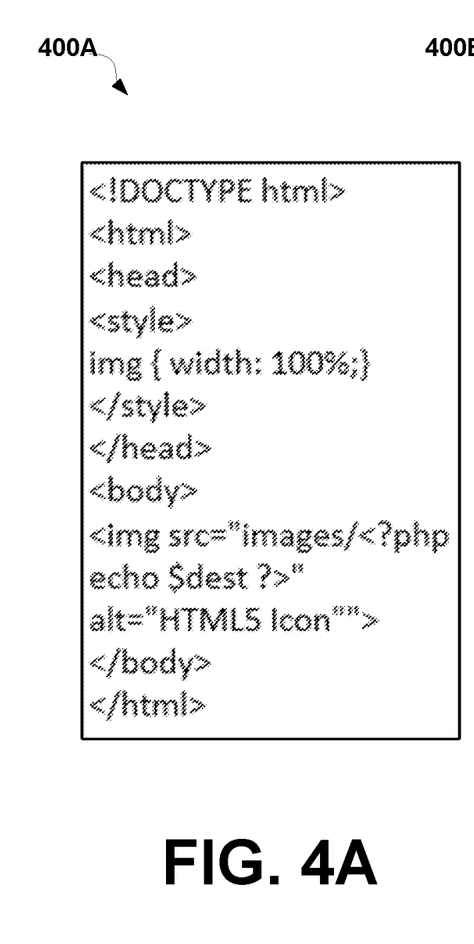
FIGS. 4A-4E are examples of code that can be used to access various types of dynamic barcode content, in accordance with some embodiments.

FIGS. 4A-4E are examples of code that can be used to access various types of dynamic barcode content, in accordance with some embodiments. For example, FIG. 4A shows an example HTML document 400A that can be used to embed an image (e.g., a banner/ad or any other type of image) that can be accessed via a dynamic barcode. The declaration <!DOCTYPE html> specifies that the document is an HTML document. The tag <html> indicates the beginning of the HTML document. The tag <head> indicates the beginning of a head section that includes HTML document metadata, such as the title, character set, stylesheets, scripts, etc. For example, the tag <style> indicates the beginning of a style section of the head section, which includes rules for styling elements within the HTML document (e.g., CSS Cascading Style Sheets (CSS) rules). For example, the rule 'img {width: 100%;}' sets the width of all image elements to 100% of the width of their containing element. This means that the image will scale to fit its container horizontally while maintaining its aspect ratio. The tag </style> indicates the end of the style section and the tag </head> indicates the end of the head section. The tag <body> indicates the beginning of the body section of the HTML document, which includes the main (e.g., visible) content. For example, the body section includes a PHP script '<img src="images/<?php echo $dest ?>"' that dynamically sets the image source of the image based on the value of the $dest (destination) variable. The attribute 'alt="HTML5 Icon"' is used to provide alternative text for the image that can be displayed (e.g., if the image cannot be loaded or if the user is using assistive technology). The tag </body> indicates the end of the body section, and the tag </html> indicates the end of the HTML document. Accordingly, the HTML document 400A can be used to load an image specified by a destination variable.

Figure 4B:
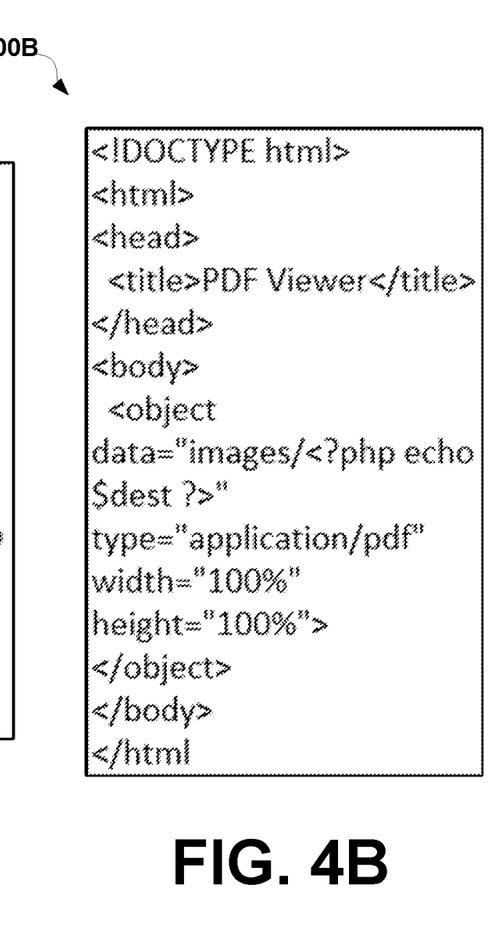

FIG. 4B shows an example HTML document 400B that is used to embed a PDF file that can be accessed via a dynamic barcode. The declaration <!DOCTYPE html> specifies that the document is an HTML document. The tag <html> indicates the beginning of the HTML document. The tag <head> indicates the beginning of a head section that includes HTML document metadata, such as the title, character set, stylesheets, scripts, etc. For example, the tag '<title>PDF Viewer</title>' sets the title of the HTML document to "PDF Viewer". The tag <body> indicates the beginning of the body section of the HTML document, which includes the main (e.g., visible) content. For example, the body section includes the element <object> that is used to embed a resource. The attribute 'data="images/<?php echo $dest ?>' is a PHP script that specifies the location (e.g., URL) of a PDF file located in an "images" directory and the file name is dynamically set by the $dest (destination) variable. The attribute 'type="application/pdf"' indicates that the resource is a PDF file. The attributes 'width="100%" height="100%"' specify the width and height of the PDF, respectively. The tag <object> indicates the end of the object element, the tag </body> indicates the end of the body section, and the tag </html> indicates the end of the HTML document. Accordingly, the HTML document 400B can be used to load a PDF file specified by a destination variable.

Figure 4C:
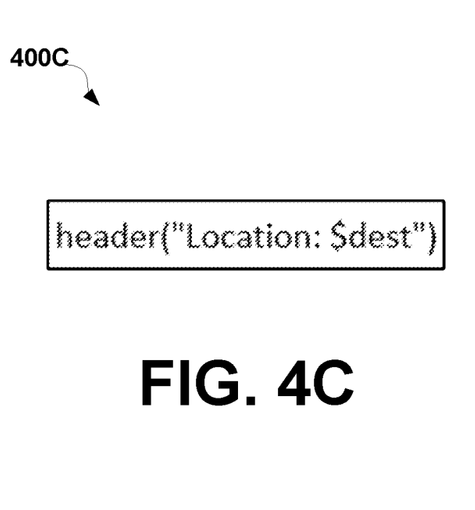

FIG. 4C shows an example script 400C (e.g., PHP script) that can be used to perform a redirection to a web address (e.g., URL) corresponding that can be accessed via a dynamic barcode. The script 400 includes a header( ) function. Generally, the header( ) function can be used to send a raw HTTP header to a user device (e.g., the user device scanning the dynamic barcode) to provide information to a browser. The argument of the header function "Location: $dest" tells the browser to redirect to the web address specified by the $dest (destination) variable. Accordingly, the script 400C can be used to redirect a user to a web address specified by a destination variable.

Figure 4D:
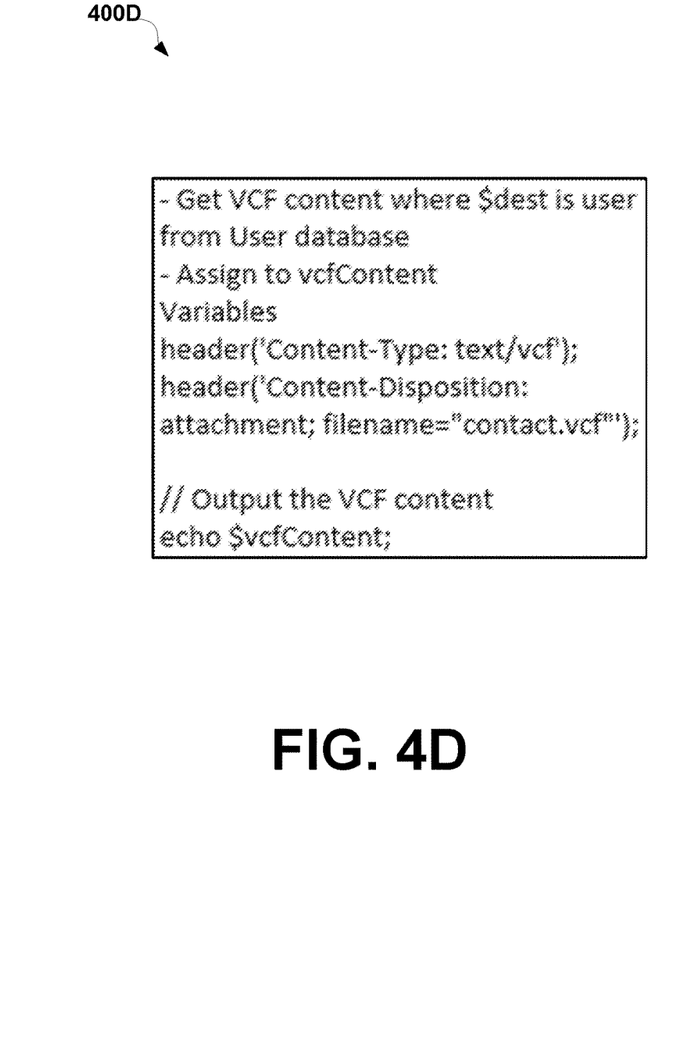

FIG. 4D shows an example script 400D (e.g., PHP script) that is used to retrieve VCF content for a user that can be accessed via a dynamic barcode. It is assumed that VCF content is retrieved from a $dest (destination) parameter corresponding to a user from a user database and assigned to $vcfContent. The header function 'header('Content-Type: text/vcf');' sets a content type header to indicate that the response is a VCF file. The header function 'header('Content-Disposition: attachment; filename="contact.vcf"');' sets a content disposition header to prompt the browser to download the VCF file with the filename "contact.vcf". The echo statement 'echo $vcfContent;' outputs the VCF content. Accordingly, the script 400D can be used to load VCF content specified by a destination variable.

Figure 4E:
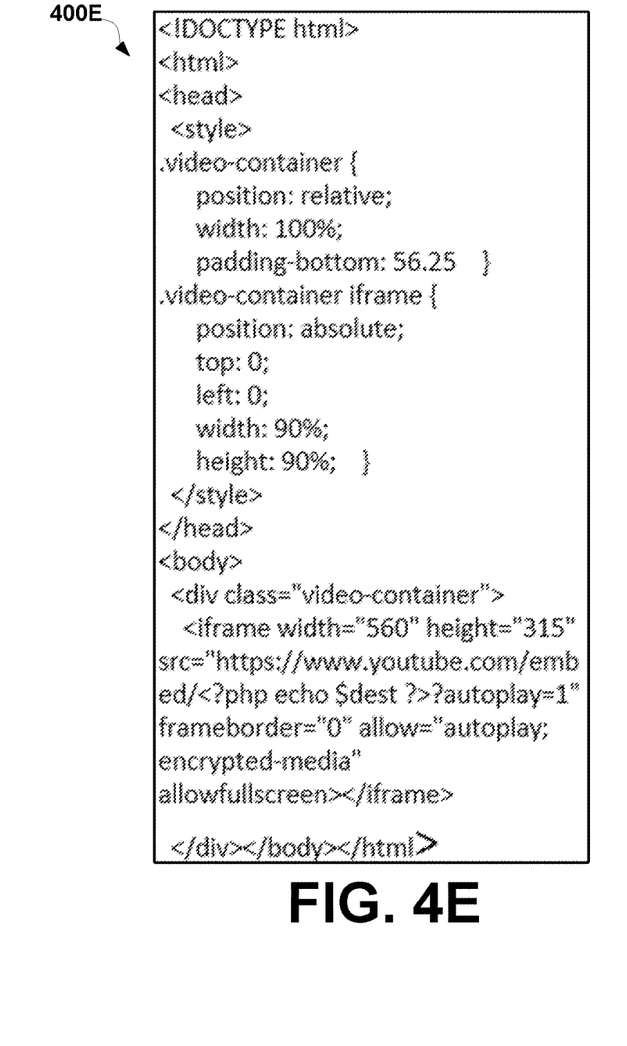

FIG. 4E shows an HTML document 400E that embeds online multimedia content, and particularly online video content from a website (in this case, from YouTube®). The declaration <!DOCTYPE html> specifies that the document is an HTML document. The tag <html> indicates the beginning of the HTML document. The tag <head> indicates the beginning of a head section that includes HTML document metadata, such as the title, character set, stylesheets, scripts, etc. For example, the tag <style> indicates the beginning of a style section of the head section, which includes rules for styling elements within the HTML document (e.g., CSS Cascading Style Sheets (CSS) rules). For example, '.video-container' is a class selected use to style a video container for the video. 'Position: relative' sets a positioning context for child elements, width: 100% causes the container to take up the entire width of the parent element, and 'padding-bottom: 56.25' defines a 16:9 aspect ratio for the video container. As another example, '.video-container iframe' identifies the iframe element inside of the video container. 'Position: absolute;' positions the iframe element absolutely within the video container, 'top: 0; left: 0' positions the iframe at the top left corner of the video container, and 'width: 90%; height: 90%;' sets the width and the height of the iframe to 90% of the video container. The tag </style> indicates the end of the style section and the tag </head> indicates the end of the head section. The tag <body> indicates the beginning of the body section of the HTML document, which includes the main (e.g., visible) content. For example, <div class="video-container"> creates a div element with the class "video-container", which will serve as the video container. The element <iframe> is used to embed the content from the source. The parameters 'width="560" height="315"' specify the width and height of the embedded video. The code 'src="https://www.youtube.com/embed/<?php echo $dest ?>?autoplay=1"' sets the source URL of the embedded video, with the video ID being dynamically set using a $dest (destination) variable. The parameter 'autoplay=1' indicates that the video should autoplay when loaded, 'frameborder="0"' removes the border around the iframe, 'allow="autoplay; encrypted-media"' allows the video to autoplay and be played in an encrypted-media context, and 'allowfullscreen' allows the video to be viewed in fullscreen mode. The tag </div> indicates the end of the div element, the tag </body> indicates the end of the body section, and the tag </html> indicates the end of the HTML document. Accordingly, the HTML document 400E can be used to load multimedia content (e.g., a video) specified by a destination variable.

Figure 5:
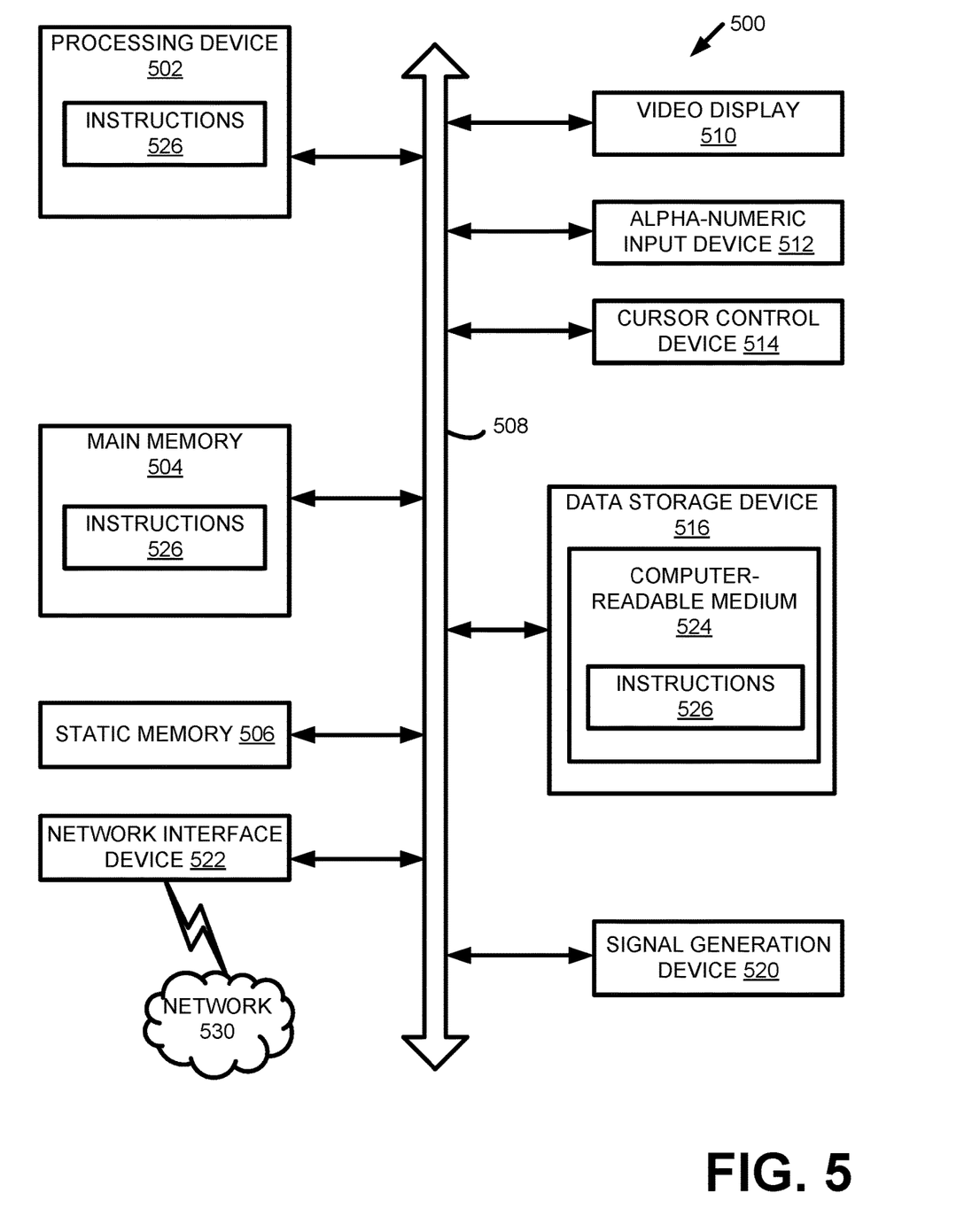
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to one or more components of system 100 of FIG. 1, such as user device 110, client device 140, and/or dynamic barcode content control system 150. The computer system 500 may be connected (e.g., networked) to other computer systems in a LAN, an intranet, an extranet, or the Internet. The computer system 500 may operate in the capacity of a server in a client-server network environment. The computer system 500 may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The computer system 500 can include a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application-specific integrated circuit (ASIC), a field-programmable gate array (FPGA), a digital signal processor (DSP), network processor, or the like. The processing device 502 is configured to execute processing logic (e.g., instructions 526) for performing the operations and steps discussed herein (e.g., corresponding to the method of FIGS. 2 and 3, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable storage medium 524 on which may store instructions 526 (e.g., corresponding to the method of FIGS. 2 and 3, etc.) embodying any one or more of the methodologies or functions described herein. Instructions 526 may also reside, completely or at least partially, within the main memory 504 and/or within the processing device 502 during execution thereof by the computer system 500, the main memory 504 and the processing device 502 also constituting computer-readable media.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Other computer system designs and configurations may also be suitable to implement the systems and methods described herein. The following examples illustrate various implementations in accordance with one or more aspects of the present disclosure.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "identifying," "obtaining," "causing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general-purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein, are meant as labels to distinguish among different elements and may not have an ordinal meaning according to their numerical designation.

What is claimed is:

1. A system comprising:
a memory device; and
a processing device, operatively coupled to the memory device, to perform operations comprising:
receiving, from a user device, a request for content accessible via a dynamic barcode;
identifying, from a database, a mode variable specifying a mode of operation for updating the content;
obtaining, from a mode table of the database corresponding to the mode of operation, mode table data; and
causing, based on the mode table data, the content to be provided to the user device.

2. The system of claim 1, wherein the dynamic barcode is implemented as a Quick Response (QR) code.

3. The system of claim 1, wherein identifying the mode variable further comprises:
causing main table data to be retrieved from a main table of the database; and
identifying the mode variable from the main table data.

4. The system of claim 1, wherein the mode variable specifies an automatic mode that automatically updates the content at a date and time in accordance with a datetime parameter.

5. The system of claim 1, wherein the mode variable specifies a repeat mode that automatically updates the content after expiration of a repeat time interval.

6. The system of claim 1, wherein the mode variable specifies an automated repeat mode that automatically updates the content daily at a particular time in accordance with a time parameter.

7. The system of claim 1, wherein the mode variable specifies a manual content update mode.

8. The system of claim 1, wherein causing the content to be provided to the user device further comprises:
selecting a row from the mode table data in accordance with the mode of operation;
identifying, from the row, a type of content from a content variable and a destination from a destination variable; and
outputting the content based on the type of content and the destination.

9. The system of claim 8, wherein the type of content is at least one of: a banner/ad, an image, a Portable Document Format (PDF) file, a Virtual Contact File (VCF), multimedia content, or a web address.

10. A method comprising:
receiving, by at least one processing device from a user device, a request for content accessible via a dynamic barcode;
identifying, by the at least one processing device from a database, a mode variable specifying a mode of operation for updating the content;
obtaining, by the at least one processing device from a mode table of the database corresponding to the mode of operation, mode table data; and
causing, by the at least one processing device based on the mode table data, the content to be provided to the user device.

11. The method of claim 10, wherein the dynamic barcode is implemented as a quick response (QR) code.

12. The method of claim 10, wherein identifying the mode variable further comprises:
causing main table data to be retrieved from a main table of the database; and
identifying the mode variable from the main table data.

13. The method of claim 10, wherein the mode variable specifies an automatic mode that automatically updates the content at a date and time in accordance with a datetime parameter.

14. The method of claim 10, wherein the mode variable specifies a repeat mode that automatically updates the content after expiration of a repeat time interval.

15. The method of claim 10, wherein the mode variable specifies an automated repeat mode that automatically updates the content daily at a particular time in accordance with a time parameter.

16. The method of claim 10, wherein the mode variable specifies a manual content update mode.

17. The method of claim 10, wherein causing the content to be provided to the user device further comprises:
selecting a row from the mode table data in accordance with the mode of operation;
identifying, from the row, a type of content from a content variable and a destination from a destination variable; and
outputting the content based on the type of content and the destination.

18. The method of claim 17, wherein causing the content to be provided to the user device further comprises:
selecting a row from the mode table data in accordance with the mode of operation;
identifying, from the row, a type of content from a content variable and a destination from a destination variable; and
outputting the content based on the type of content and the destination.

19. A system comprising:
a memory device; and
a processing device, operatively coupled to the memory device, to perform operations comprising:
obtaining a set of data include first data for initializing a main table of a database used to update content accessible via a dynamic barcode, wherein the first data comprises a content variable specifying a type of content and a mode variable specifying a mode of operation;
initializing the main table based on the first data;
generating a destination variable based on the type of content identified from the main table;
identifying the mode of operation from the main table; and
initializing, based on second data comprising the destination variable, a mode table of the database, wherein the mode table is determined from the mode of operation.

20. The system of claim 19, wherein the mode variable specifies one of:
an automatic mode that automatically updates the content at a date and time in accordance with a datetime parameter comprised in the second data;
a repeat mode that automatically updates the content after expiration of a repeat time interval comprised in the second data; or
an automated repeat mode that automatically updates the content daily at a particular time in accordance with a time parameter comprised in the second data.

* * * * *